United States Patent [19]

Krueger et al.

[11] Patent Number: 4,937,838
[45] Date of Patent: Jun. 26, 1990

[54] GAS LASER ARRANGEMENT

[75] Inventors: Hans Krueger, Munich; Wilhelm Tiemann, Bubenreuth; Herbert Lamprecht, deceased, late of Munich; by Thekla Lamprecht, heir; by Simon Lamprecht, heir, both of Landsberg/Lech, all of Fed. Rep. of Germany

[73] Assignee: Siemens Aktiengesellschaft, Berlin and Munich, Fed. Rep. of Germany

[21] Appl. No.: 250,438

[22] Filed: Sep. 28, 1988

[30] Foreign Application Priority Data

Sep. 28, 1987 [DE] Fed. Rep. of Germany ....... 3732638

[51] Int. Cl.$^5$ ............................................ H01S 3/097
[52] U.S. Cl. ........................................ 372/87; 372/38
[58] Field of Search ..................... 372/61, 65, 86, 87, 372/38

[56] References Cited

U.S. PATENT DOCUMENTS

| 3,753,144 | 8/1973 | Kearns et al. | 372/62 |
| 4,331,939 | 5/1982 | Kuwabara et al. | 372/61 |
| 4,378,600 | 3/1983 | Hobart . | |
| 4,385,390 | 5/1983 | McMahan | 372/63 |
| 4,541,097 | 9/1985 | Kuwabara et al. | 372/88 |
| 4,590,599 | 5/1986 | Kawakubo et al. | 372/87 |
| 4,649,547 | 3/1987 | Carlson et al. | 372/62 |
| 4,759,027 | 7/1988 | Hahn et al. | 372/66 |
| 4,841,540 | 6/1989 | Krueger et al. | 372/86 |

Primary Examiner—Léon Scott, Jr.
Attorney, Agent, or Firm—Hill, Van Santen, Steadman & Simpson

[57] ABSTRACT

A gas laser arrangement includes a discharge tube between a cathode and an anode, the discharge tube including a central discharge channel and at least one gas return channel. A blocking electrode is provided at the openings of the gas return channels at least in the cathode space and possibly also in the anode space, the blocking electrode being connected to a blocking voltage to avoid misfirings of the laser through the gas return channels.

12 Claims, 4 Drawing Sheets

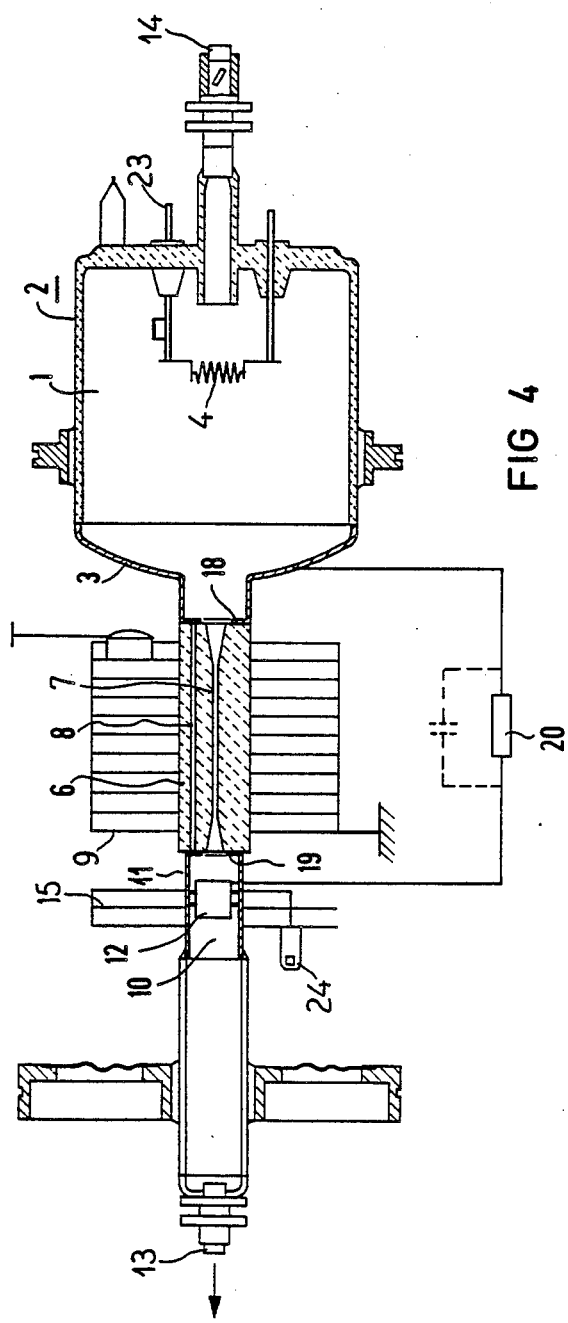

//4,937,838//

GAS LASER ARRANGEMENT

BACKGROUND OF THE INVENTION

1. Field of the Invention

The present invention is directed generally to a gas laser arrangement including a discharge tube disposed between a cathode and an anode, the discharge tube being provided with a discharge channel and at least one gas return channel.

2. Description of the Related Art

As is known, gas lasers, for example, argon ion lasers generate an output power of up to several watts in the visible range which is suitable for use as a light source for scientific and industrial applications including in spectroscopy, holography and non-destructive materials testing as well as being suitable for use in eye and skin surgery. In a gas laser, a gas discharge is ignited in the discharge channel of the discharge tube between a cathode and an anode. The discharge tube is generally composed of an electrically insulating material which may be, for example, a ceramic such as beryllium oxide (BeO), aluminum nitride (AlN) or aluminum oxide ($Al_2O_3$). The discharge tube can also be composed of a cascade, or in succession, of metal discs and insulators. The gas discharge channel in the discharge tube is in the form of a capillary bore having a diameter generally of not more than 3 mm. A gas return channel is provided either as an internal or external connecting channel relative to the discharge tube and extending between the anode space and the cathode space through which gas flows for pressure equalization.

In a known embodiment of a gas laser for generating relatively low power, for example, a ceramic tube is provided for use as a discharge tube the ceramic tube including metallic cooling ribs to eliminate heat. In another embodiment having what is referred to as a stacked structure, the discharge tube is alternately formed of ceramic rings and metallic cooling discs which are each provided with a central bore and are stacked on top of one another in alternation so that the central bores form a discharge channel. In this arrangement, internal gas return paths are formed by a plurality of gas return channels arranged in the discharge tube parallel to the discharge channel. See, for example, U.S. Pat. No. 3,753,144.

A further embodiment of a gas laser for high power use includes a cathode space, a discharge channel, and an anode space are all surrounded by a common discharge tube having a relatively thin wall of ceramic which is cooled by water. The discharge channel is formed of a greater plurality of pot-shaped or cup-shaped, metal elements each of which is provided with a central bore in the base thereof. The metal elements are arranged in succession in the discharge tube. The bores in the cup-shaped elements together form a central discharge channel and are each surrounded by the hollow cylindrical projection or wall of the cup-shaped metal elements. In the region of the bore, a part of the floor or base of the cup-shaped metal elements is composed of a sputter-resistant material such as tungsten. To provide for gas return, the metal elements include additional bores in the region of their edges. In the outer edge region, the metal elements are soldered to the inside wall of the discharge tube. See, for example, U.S. Pat. No. 4,378,600.

SUMMARY OF THE INVENTION

An object of the present invention is to improve ignition behavior in gas lasers and particularly in argon and krypton ion lasers. More specifically, misfirings in the gas return channels or failure of the laser ignition is to a large extent avoided by the apparatus according to the present invention so that the useful life of a gas laser arrangement is not limited by ignition problems.

The present invention is based upon the perception that charge carriers can be lost due to wall impacts in the relatively narrow and long bore of the discharge channel during the build up, or start up, phase of the discharge. The loss of charge carriers makes ignition during the build up of the discharge more difficult. In more detail, the discharge channel can change under the influence of the arc after a relatively long operating duration of the gas laser arrangement. For example, the wall of the bore can erode due to ion sputtering events, or contamination zones can be formed thereon which are at least partly composed of metal deposits. These changes lead to the possibility that the discharge no longer ignites or that a misfiring occurs through the gas return channels. After a long operating duration, aging of the cathode as well as possible gas contamination also contribute to problems.

A solution to these problems is inventively achieved according to this invention by allocating a blocking electrode to the openings of the gas return channels in a cathode space and by connecting the blocking electrode to a blocking voltage source. The cathode space is generally at the end of the gas laser housing in which the cathode is located. The blocking potential, or voltage, thus, provides blocking of the passage of the annode ignition voltage through the gas return channels. The blocking electrode is connected to a blocking voltage source, preferably through a resistor which can also be a capacitive resistor or an ohmic resistor and capacitor combination. A particularly simple embodiment of the gas laser arrangement is obtained when the blocking electrode is electrically connected to the anode through a high impedance, electrically conductive connection so that the anode voltage also simultaneously serves as a blocking voltage source.

In an especially advantageous further embodiment, the openings of the gas return channels in the anode space (at the opposite end from the cathode) are also provided with a blocking electrode.

BRIEF DESCRIPTION OF THE DRAWINGS

FIG. 4 is a longitudinal cross section of a further embodiment of a gas laser arrangement of the invention.

DESCRIPTION OF THE PREFERRED EMBODIMENTS

Figure 1:
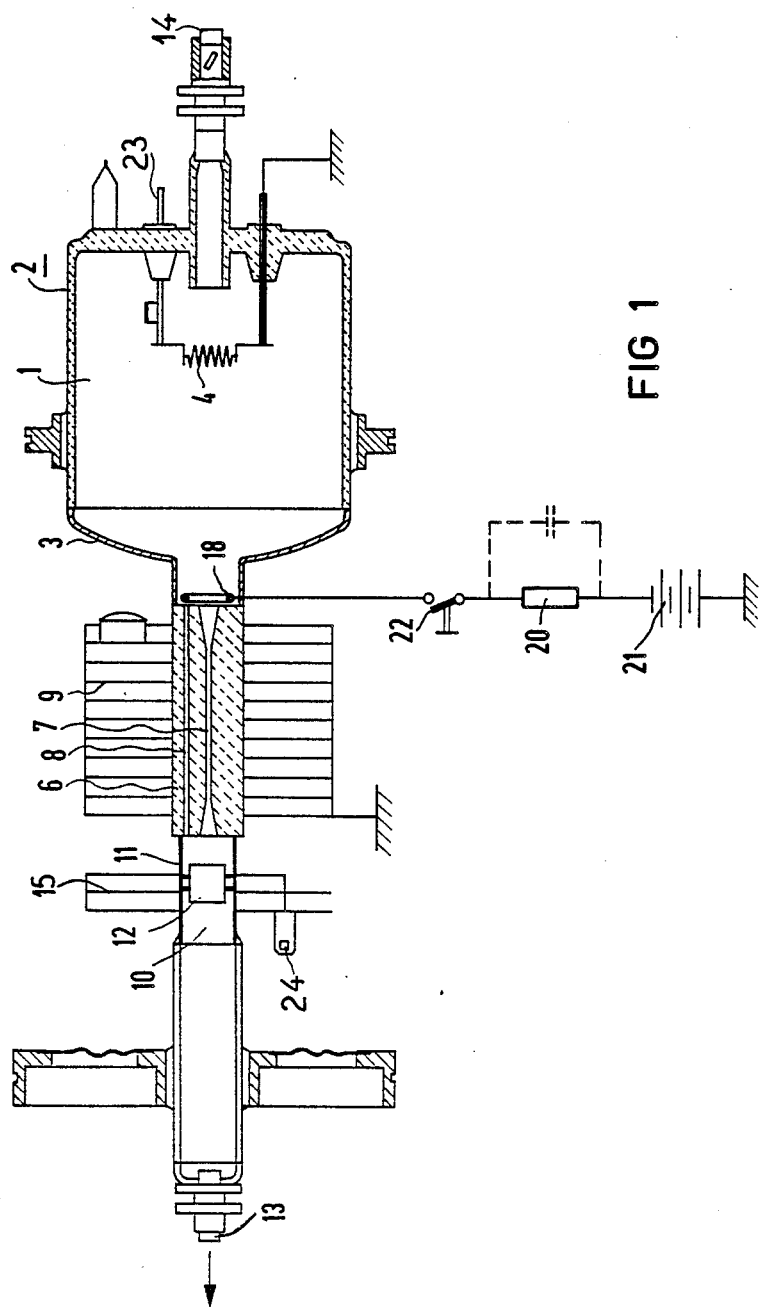
FIG. 1 is a longitudinal cross section of a gas laser arrangement according to the principles of the present invention and including a special blocking electrode in a cathode space.

In the embodiment of FIG. 1, a cathode space 1 of a gas laser arrangement is surrounded by a cathode housing 2 which is partially composed of glass or ceramic and is provided with a metal flange 3. The cathode space 1 is in the region of a cathode 4 which is in the form of a heating coil. The metallic flange 3 is connected to one end of a discharge tube 6 that is preferably composed of ceramic such as, for example, beryllium oxide (BeO). The discharge tube 6 is provided with a central bore forming a discharge channel 7 and further including a plurality of gas return channels 8, only one of which is shown in FIG. 1. The gas return channels 8 are shown in the discharge tube 6 thereby forming a compact structure but can be outside the tube 6 as well. Metallic cooling ribs or fins 9 are mounted on the external surface of the ceramic discharge tube 6 to carry heat away from the tube 6. An anode space 10 is in the region of an anode 12 of the gas laser arrangement, the anode space 10 being surrounded by a metallic anode housing 11 that can likewise be provided with cooling ribs 15 (not shown in detail) for heat elimination. At opposite ends of the gas laser arrangement are provided mirrors 13 and 14 forming an optical resonator. The laser arrangement is tightly sealed to contain a laser active gas.

For igniting the gas discharge in the gas laser, the cathode 4 is first preheated by applying a voltage to a cathode lead 23. As soon as the cathode 4 reaches its operating temperature, for example, of about 1050° C., an ignition pulse of, for example, from about 2 through 5 kV is briefly applied to the anode 12 from an ignition voltage source (not shown) electrically connected through an anode lead 24. This initiates an arc discharge which burns through the narrow discharge channel 7 of the discharge tube 6 from the cathode 4 to the anode 12 with a plasma current of from a few amperes to up to a few tens of amperes. The gas return channels 8 serve to equalize the pressure within the cathode space 1 and the anode space 10. Due to the high current density arc discharge in the discharge channel, the gas within the laser arrangement, which is, for example, an inert gas or a gas mixture and is preferably argon or krypton having a pressure of about 1 Torr, is excited to laser activity. The generated laser beam leaves the system through the out-coupling mirror, such as the partially silvered mirror 13 as indicated by an arrow shown schematically in FIG. 1.

According to the invention, at least the openings of the gas return channels 8 in the cathode space 1 have a blocking electrode 18 allocated to them. The blocking electrode 18 is connected to a blocking voltage source through a high impedance resistor 20. The high impedance resistor 20 can also be a capacitive resistor connected in the circuit of FIG. 1 or, as shown in broken lines in FIG. 1, an ohmic resistor and capacitor combination, connected in parallel, may be provided. A switch 22 or other switching means is connected to selectively apply a blocking voltage to the blocking electrode 18 wherein the blocking voltage is supplied by a voltage source 21. The switch 22 is preferably an electronic switch and is shown as a manually actuated key switch in FIG. 1 for the sake of simplicity. Through the switch, the blocking voltage of the blocking voltage source 21 is connected to the blocking electrode 18, the blocking voltage source 21 being connected to ground potential at the other side. To obtain a pure voltage control, ignition of an independent discharge to the blocking electrode 18 is to be avoided, and accordingly the resistant value of the resistor 20 is correspondingly high.

The blocking electrode 18 is designed and applied so that the passage of the anode ignition voltage through the gas return channels 8 is effectively blocked but disturbance of the gas return flow from the openings of the gas return channels 8 into the cathode space 1 is avoided. Also, the passage of the discharge through the central discharge channel 7 is not impeded by the blocking electrode 18.

Figure 2:
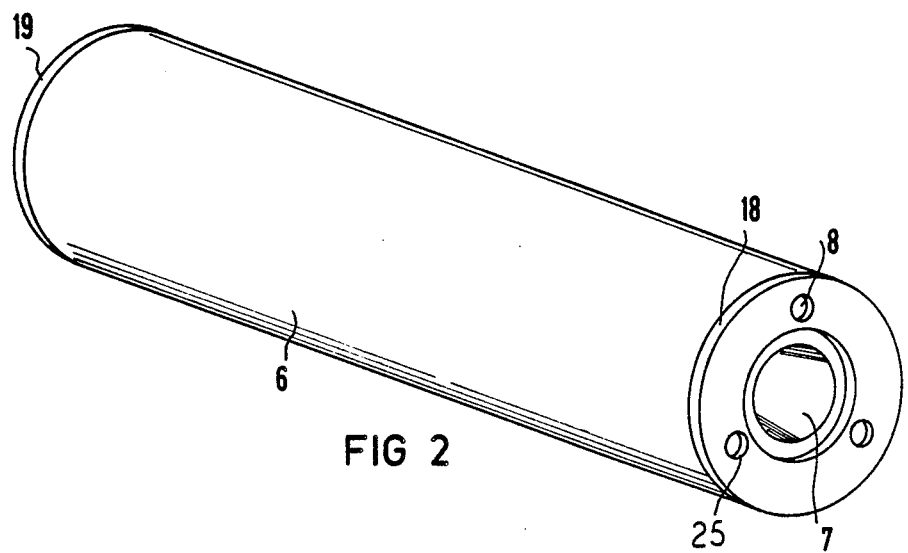
FIG. 2 is a perspective view of a gas laser discharge tube including a special design of a blocking electrode.

In a preferred embodiment as shown in FIG. 2, the blocking electrode 18 is formed as a metal electrode in the shape of an annular disc which roughly covers the outer edge of an end face of the discharge tube 6 and includes corresponding openings 25 for the gas return channels 8. In the illustrated embodiment, three gas return channels 8 are provided in the discharge tube 6 as well as three openings 25 in the electrode 18. A second blocking electrode 19 is provided at the opposite end face of the discharge tube 6, as will be discussed later. In one embodiment, the blocking electrode 18 is expediently vapor deposited or sputtered onto the end face of the discharge tube 6.

Figure 3:
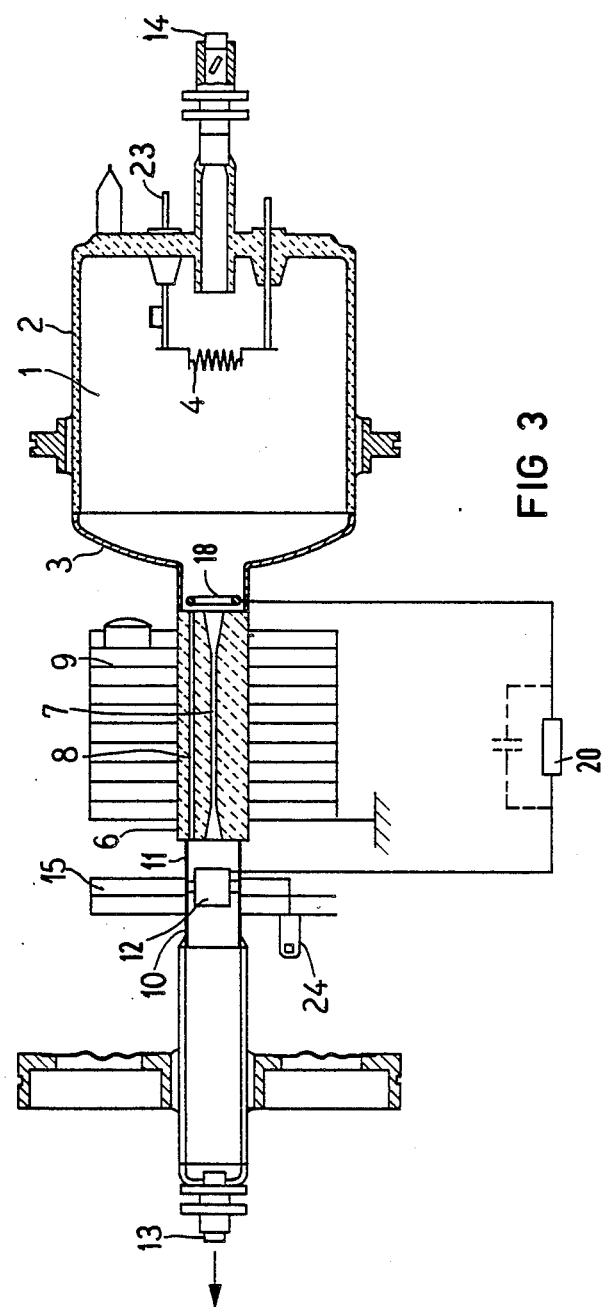
FIG. 3 is a longitudinal cross section of another embodiment of the present invention showing the use of anode potential to supply a blocking voltage.

In FIG. 3, a simplified embodiment of the gas laser arrangement is shown which utilizes the anode potential as a blocking voltage source. Elements which are similar to those of the first embodiment are provided. In particular, the blocking electrode 18 is connected through the resistor 20 having a resistance of at least 5 Megohms to either the anode housing 11 or directly to the anode 12 in electrically conductive fashion. In the embodiment of FIG. 3, there is no need of a separate blocking voltage source.

Referring to FIG. 4, an especially advantageous embodiment is shown in which not only is the end face of the discharge tube 6 facing the cathode space 1 provided with a blocking electrode 18 but also the end face of the discharge tube 6 facing toward the anode space 10 is provided with the second annular blocking electrode 19. The second annular blocking electrode 19 is also provided with openings for the gas return channels 8. The second blocking electrode 19 is preferably connected to the anode 12 through the anode housing 11 in electrically conductive fashion. Although the second blocking electrode 19 may be formed of deposited metal as with the first electrode 18 in FIG. 2, the blocking electrode 19 may also be composed of a flange like projection of the anode housing 11 which is joined, for example, by soldering to the discharge tube 6.

A further simplification in this embodiment is shown in FIG. 4 in that the blocking electrode 18 is connected in electrically conductive fashion to an electrically conductive portion of a cathode housing in the form of the metal flange 3. The flange 3 can then be applied to a blocking voltage by connecting the anode potential through the resistor 20. An extension of the metal flange 3 than forms the blocking electrode 18.

A further advantage of a gas laser arrangement is realized when the discharge tube 6 is at least partially composed of an insulator member and comprising the cooling ribs 9 connected to one another in electrically conductive fashion and being connected to ground potential as shown in FIGS. 1, 3 and 4. As a result of these measures, the electrical field lines in the region of the gas return channels 8 are deflected in the direction toward the cooling member. Due to this deflection, the charge carriers are no longer accelerated in the direction of a cathode 4. Ignition of the discharge through the gas return channels 8 is thus avoided both in addition to the design features that have been set forth as well as independently thereof.

As such, the present invention provides a gas laser arrangement, such as for an argon ion laser, which makes misfirings through the gas return channels practically impossible.

Although other modifications and changes may be suggested by those skilled in the art, it is the intention of the inventors to embody within the patent warranted hereon all changes and modifications as reasonably and properly come within the scope of their contribution to the art.

We claim:

1. An improved gas laser arrangement having a discharge tube arranged between a cathode and an anode, a discharge channel and at least one gas return channel in said discharge tube, the improvement comprising:
   a blocking electrically conductive electrode mounted at openings of said at least one gas return channel in said discharge tube in a cathode space of said gas laser arrangement; and
   means for connecting a voltage to said blocking electrode which in combination with the location and electrical conductivity of said blocking electrode prevents a gas discharge through said at least one gas return channel as long as said voltage is applied to said electrode.

2. An improved gas laser arrangement as claimed in claim 1, further comprising:
   a resistor connected between said blocking electrode means and a blocking voltage source.

3. An improved gas laser arrangement as claimed in claim 1, wherein said blocking electrode means is an annular disc arranged at an end face of said discharge tube, said annular disc being provided with an opening for each of said at least one gas return channel.

4. An improved gas laser arrangement as claimed in claim 1, further comprising:
   means for connecting a voltage of the anode to said blocking electrode means to form a blocking voltage.

5. An improved gas laser arrangement as claimed in claim 1, further comprising:
   a cathode housing at a cathode end of said discharge tube, said cathode housing having a metal part electrically connected to said blocking electrode means, and
   said blocking electrode means being electrically connected to said anode through said metal part of said discharge tube.

6. A gas laser arrangement as claimed in claim 1, further comprising:
   a second blocking electrode means for blocking ignition of a gas discharge in the at least one gas return channel, said second blocking electrode means being mounted at openings of said at least one gas return channel in an anode space, said second blocking electrode means being electrically connected to said anode.

7. A gas laser arrangement as claimed in claim 1, further comprising:
   a capacitive resistor connected to said blocking electrode means.

8. A gas laser arrangement as claimed in claim 1, further comprising:
   an ohmic resistor and a capacitor combination connected to said blocking electrode means.

9. A gas laser arrangement as claimed in claim 1, wherein said discharge tube is at least partially composed of an insulating member, and further comprising:
   cooling ribs provided on said discharge tube, said cooling ribs being electrically connected to one another and to ground.

10. A gas laser arrangement, comprising:
    a sealed housing for containing a laser active gas;
    a cathode in a cathode space in said housing;
    an anode in an anode space in said housing;
    a discharge tube positioned in said housing between said cathode and said anode and having a longitudinally extending discharge channel in which a laser discharge occurs;
    at least one gas return channel extending between said cathode space and said anode space through which a laser active gas flows during operation of the gas laser and having an opening in said cathode space of said housing;
    an electrically conductive discharge blocking electrode provided in said housing at a cathode end of said at least one gas return channel, said blocking electrode being mounted at a position relative to said opening of said at least one gas return channel; and
    means for connecting said discharge blocking electrode to a voltage for preventing, in combination with the location and conductivity of said blocking electrode, discharges through said at least one gas return channel when charged with a discharge blocking voltage while permitting gas to flow through said at least one gas return channel.

11. An improved gas laser arrangement as claimed in claim 1, wherein said gas laser is a rare gas laser.

12. A gas laser arrangement as claimed in claim 10, wherein said cathode space is separated from said anode space except by said discharge channel and said at least one gas return channel.

* * * * *